UNITED STATES PATENT OFFICE.

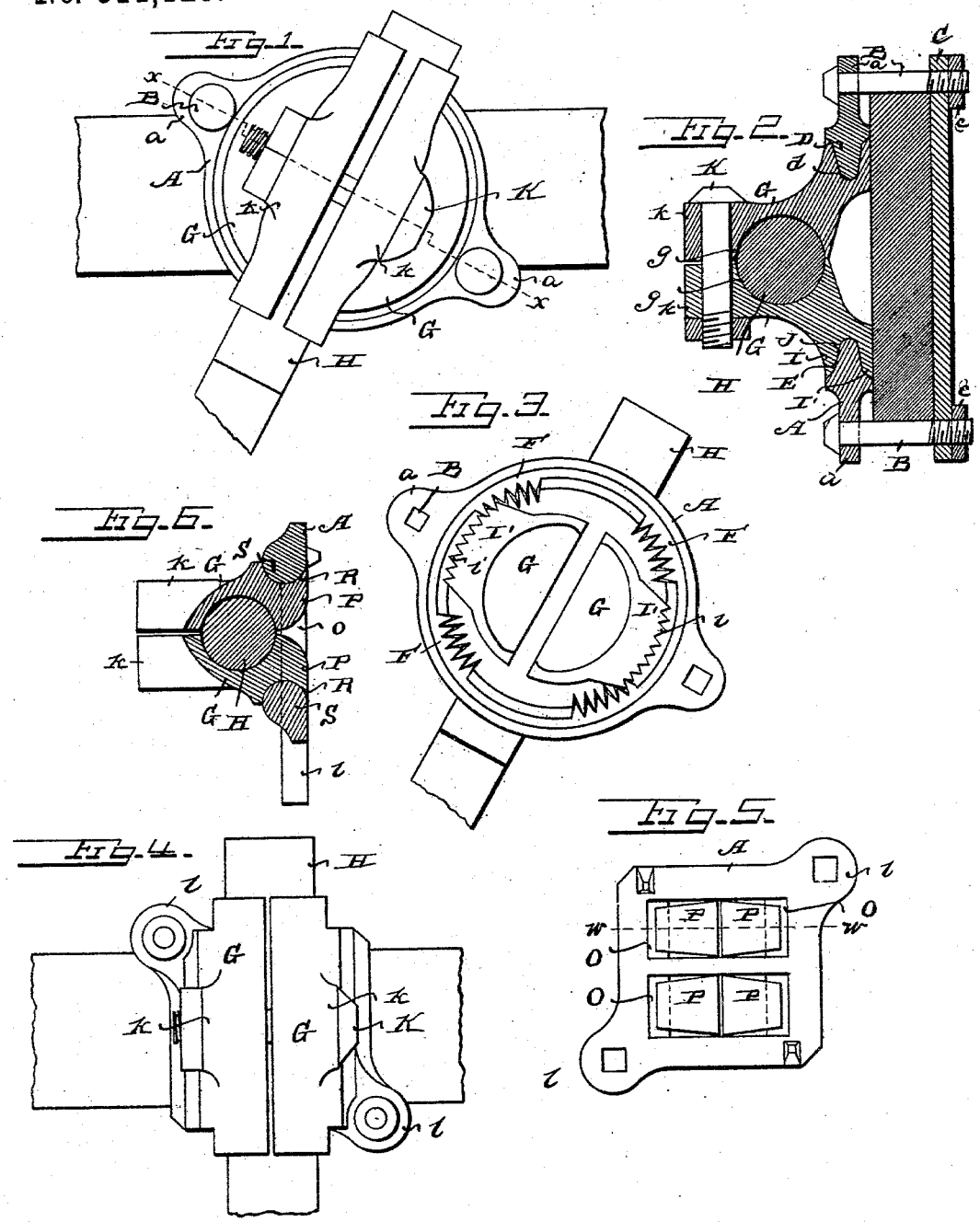

JOHN CLAYTON, OF MINNEAPOLIS, MINNESOTA.

COLTER-CLAMP.

SPECIFICATION forming part of Letters Patent No. 511,123, dated December 19, 1893.

Application filed March 31, 1893. Serial No. 468,468. (No model.)

*To all whom it may concern:*

Be it known that I, JOHN CLAYTON, a citizen of the United States, and a resident of Minneapolis, in the county of Hennepin and State of Minnesota, have invented certain new and useful Improvements in Colter-Clamps; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a face view of the clamp applied. Fig. 2 is a section on line $x\,x$ Fig. 1. Fig. 3 is a rear view of the clamp. Fig. 4 is a face view of the modified form of clamp and Fig. 5 is a rear view of the modification. Fig. 6 is a section on the line $w, w,$ Fig. 5.

This invention has relation to certain new and useful improvements in colter clamps for plows, the object being to provide a simple and effective device of improved construction for securing colter shanks to plow beams; and the invention consists in the novel construction and combination of parts, all as hereinafter specified and pointed out in the claims.

The invention consists more particularly in a clamp which engages the plow beam, and a second clamp which holds the colter shank, the latter comprising a pair of jaws having a detachable engagement with the beam clamp.

In Fig. 1 of the accompanying drawings, the beam clamp is shown as comprising an annular plate A, formed with oppositely projecting lugs $a$, having perforations therethrough, the plate being secured to a lateral face of the plow beam by means of bolts B, B, through said perforations, one bolt above and one below the beam, and through a second bar or plate C at the opposite side, where the bolts are secured by nuts $c$. The central circular opening of said plate A is surrounded by an annular portion D, depressed or sunk inward from both faces of the plate, and having a rounded edge $d$. The walls E of this sunk or depressed portion D at both sides of the plate are inclined, sloping toward the central opening. On the inner face of the plate, or that face which sets against the beam, the wall E is formed with a number of toothed segments F, the teeth of which project radially inward toward the central opening.

The colter clamp comprises two somewhat elongated sections or jaws G, G, of similar form, having each on its meeting face a semicircular concavity $g$, the two concavities forming a seat to receive the shank H of the colter. At its inner end each section or jaw G, G, is provided with a semi-circular projection I, forming a flange the inner face of which seats on the outer surface of the portion D, and beyond this projection is a second segmental projection I′, having teeth $i$. Between the two projections I, I′, is a seat J, which receives the rounded edge $d$ of the portion D. The teeth $i$ when the clamp is in place project over the inner face of the portion D into engagement with the teeth $f$ of the segments F. The two jaws or segments G, G, are held together by means of a bolt K, through registering perforations in lugs $k$ of the sections. The perforation in one lug may be made square, while that in the other is circular, as shown.

The engagement of the toothed segments effectually prevents the colter shank from moving out of place under the pressure brought to bear upon it, while the jaws may be readily adjusted in their engagement with the segments of the clamp plate for the purpose of setting the colter at different angles of inclination.

By shifting the segments J′ from one set of the segments F to another, the clamp may be rendered either right or left, as may be desired.

In Figs. 4, 5 and 6 is shown another form of the invention constructed on the same principle as that above described. In this construction the clamp plate A is shown as of diamond shape, although this is not essential, perforated lugs or extensions $l$ being provided at the upper and lower corners. The jaws or sections G, G, in this construction are formed each with a pair of lugs or projections P, P, which take the place of the segments J′ in the construction first described, and engage the clamp plate by passing through slots O, O, therein; the hooked ends of the lugs catching under the edges of the slots at the inner face of the plate. Each section is also formed with a longitudinal concavity R, which bears against a convex rib S on the clamp plate.

The colter shank is clamped in the same manner as first described.

By reason of the concavities R and the bearing ribs S, it will be apparent that the two jaws or sections in the form last described are capable of a rocking, pivotal movement upon the clamp plate A, toward and away from each other, in order to facilitate their engagement and disengagement from said plate. This feature also permits the said jaws or sections to be opened more or less to admit colter shanks of different diameters. In the form first described, and illustrated in Figs. 1, 2, and 3, the same effect is accomplished by means of the bearing afforded by the parts $d$ and J, as before described.

Having described this invention, what I claim as my invention, and desire to secure by Letters Patent, is—

1. A device for attaching colters to plows, said device comprising a beam clamp having a plate provided with an opening therein, and a clamp for the colter shank comprising a pair of separable jaws or sections concaved on their meeting faces, and having lugs or projections arranged to detachably and pivotally engage said plate, registering perforated lugs on said jaws or sections, and a securing bolt engaging said lugs, substantially as specified.

2. A colter clamp for plows, comprising a beam clamp having an annular plate provided with a central circular opening, a depressed portion surrounding said opening, a series of toothed segments on the wall of said depressed portion at the inner face of the plate, and a pair of jaws or sections forming the colter clamp proper and having toothed segmental projections designed to adjustably and detachably engage the segments of said plate, substantially as specified.

3. In a colter clamp, the combination of the beam clamp having the annular plate A, its depressed portion surrounding the opening in said plate, the surrounding walls of said depressed portion being inclined, and segmental toothed portions on said wall at the inner face of the plate, of the jaws or sections forming the colter clamp proper, the projections J thereon, the toothed segmental projections J', the seat between said projections J and J', which receives the edge of said depressed portion, said projections J' being designed to engage with the toothed segments of the plate A, and means for securing said jaws or sections together, substantially as specified.

4. The combination with the plates A and C, with the bolts B, B, of the jaws or sections G, G, concaved to receive the colter shank, the perforated registering lugs on said jaws or sections, the flanges or projections seating on said plate A, and the toothed segmental projections designed to detachably and adjustably engage toothed portions on said plate A, substantially as specified.

In testimony whereof I affix my signature in presence of two witnesses.

JOHN CLAYTON.

Witnesses:
 G. L. FORT,
 B. T. RANDALL.